United States Patent [19]

Saunders

[11] Patent Number: 4,810,000

[45] Date of Patent: Mar. 7, 1989

[54] COMPENSATING TRAINING WHEEL ASSEMBLY FOR A BICYCLE

[76] Inventor: Stephen R. Saunders, 4649 Tim Tam Trail, Blasdell, N.Y. 14219

[21] Appl. No.: 115,849

[22] Filed: Nov. 2, 1987

[51] Int. Cl.$^4$ .......................... A63B 69/16; B62H 1/12
[52] U.S. Cl. .................................... 280/293; 280/301; 280/112.2
[58] Field of Search ............... 280/293, 298, 299, 300, 280/301, 302, 303, 289 R, 112 A, 282, 43, 43.13, 43.17, 47.16; 248/351, 163.1, 163.2; 211/17, 22

[56] References Cited

U.S. PATENT DOCUMENTS

| 1,601,392 | 9/1926 | Holtzman | 280/293 |
| 2,450,979 | 10/1948 | Moller | 280/293 |
| 2,696,387 | 12/1954 | Nordin | 280/112 A |
| 2,793,877 | 5/1957 | Meier | 280/293 |
| 3,237,961 | 3/1966 | McMullen | 280/282 |
| 3,642,305 | 2/1972 | Pawsat | 280/293 |
| 3,937,486 | 2/1976 | Weiters | 280/282 |
| 4,313,511 | 2/1982 | Soo Hoo | 280/293 |
| 4,595,213 | 6/1986 | Tsuchie | 280/293 |

FOREIGN PATENT DOCUMENTS 9396 of 1897 United Kingdom ................ 280/307

*Primary Examiner*—David M. Mitchell
*Assistant Examiner*—Everett G. Diederiks, Jr.
*Attorney, Agent, or Firm*—Christel, Bean & Linihan

[57] ABSTRACT

A training wheel assembly for a bicycle including brackets for attachment to the body of the bicycle and a pair of auxiliary wheels supported by the brackets for engagement of the ground distally of and to opposite sides of the bicycle utilizes a link member connected between each auxiliary wheel and a corresponding bracket and cables operatively attached between the front wheel of the bicycle and the link member. Each auxiliary wheel is journaled at its center to a link member for rotation relative thereto, and each link member is connected to the corresponding bracket for pivotal movement relative thereto so that when the brackets are operatively attached to the bicycle body, the center of the auxiliary wheels are pivotally movable relative to and about the bracket between a raised condition and a lowered condition. The cables are connected between the front wheel of the bicycle and the link members for pivoting the auxiliary wheels between the raised and lowered conditions in response to a steering turn of the front wheel to either accommodate or contribute to the leaning of the bicycle when turned to effect a steering change so that the normal action of a bicycle is simulated and the bicycle is stably supported by the training wheel assembly during the course of the steering change.

14 Claims, 2 Drawing Sheets

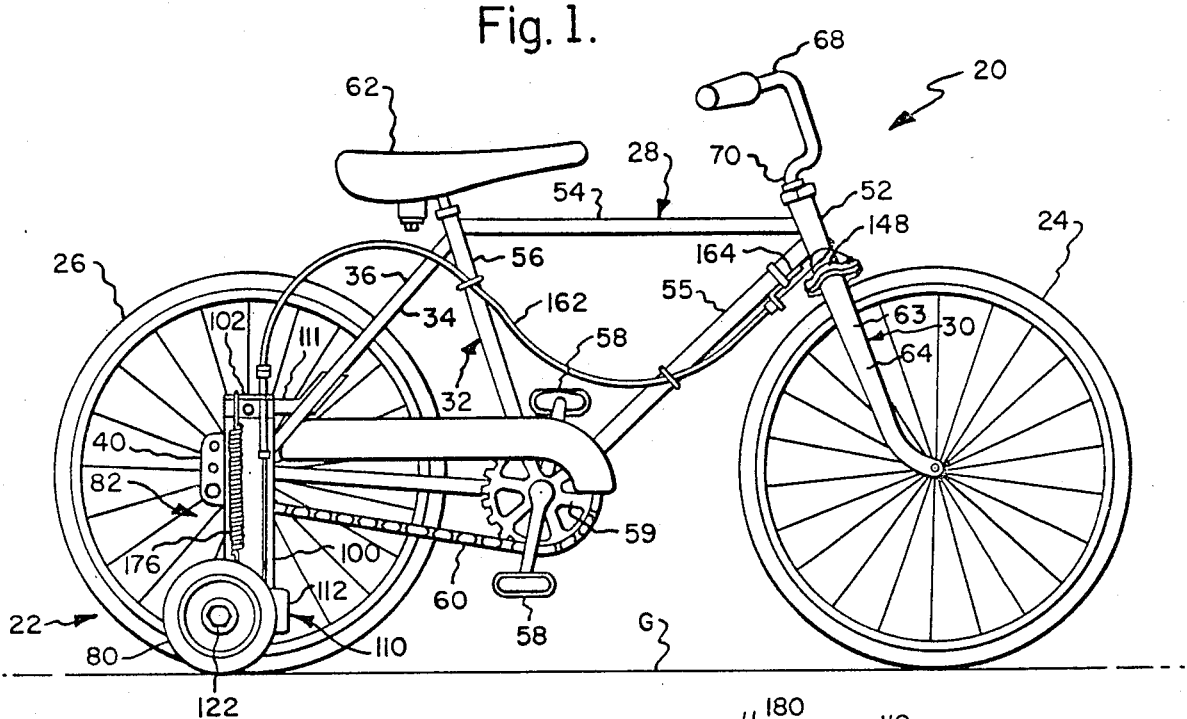
Fig. 1.
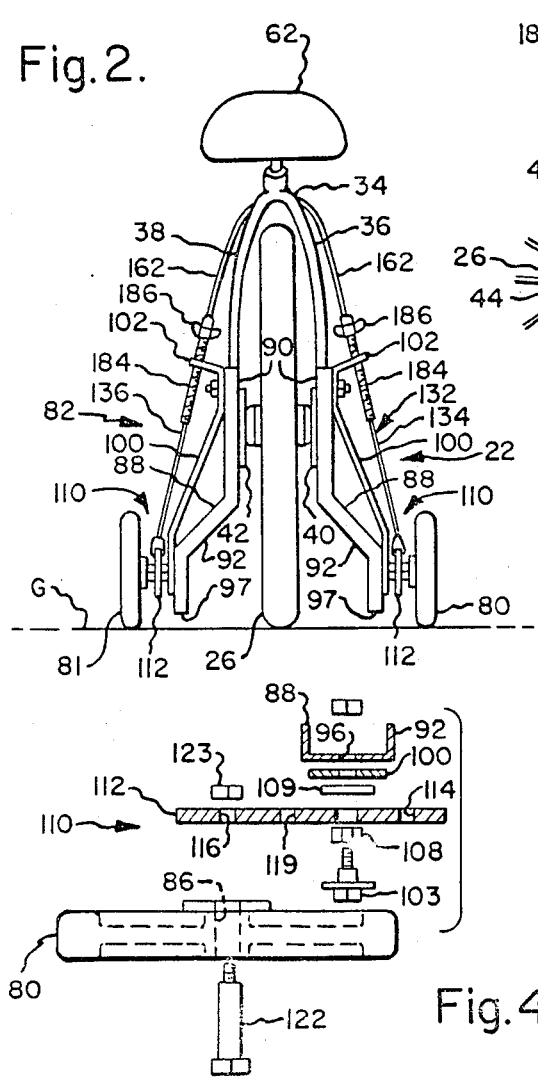
Fig. 2.
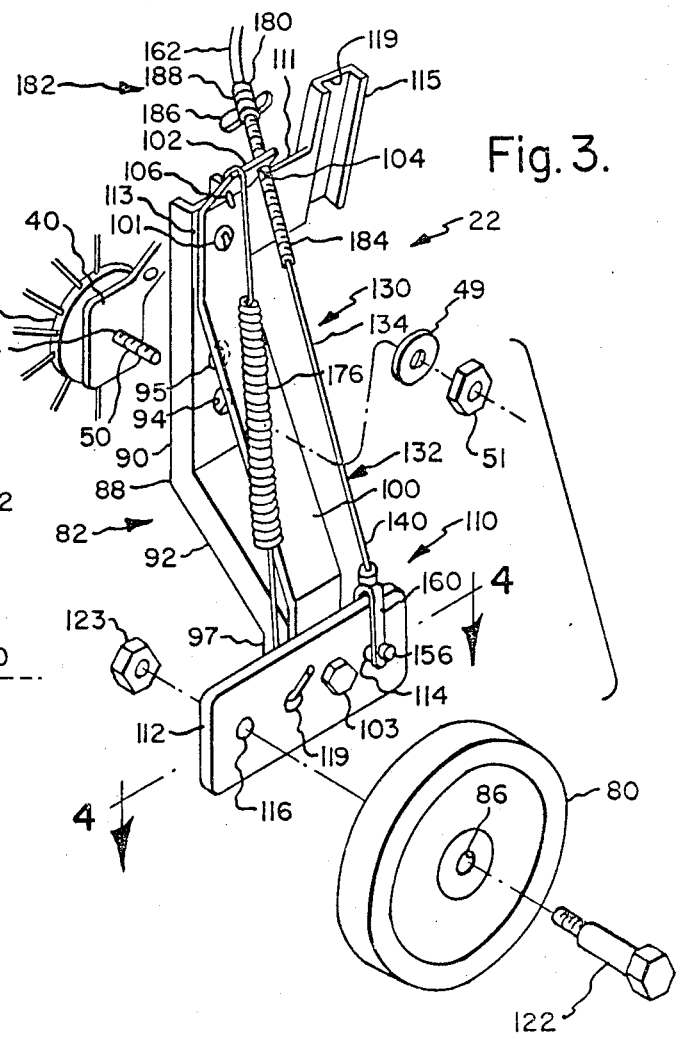
Fig. 3.
Fig. 4.

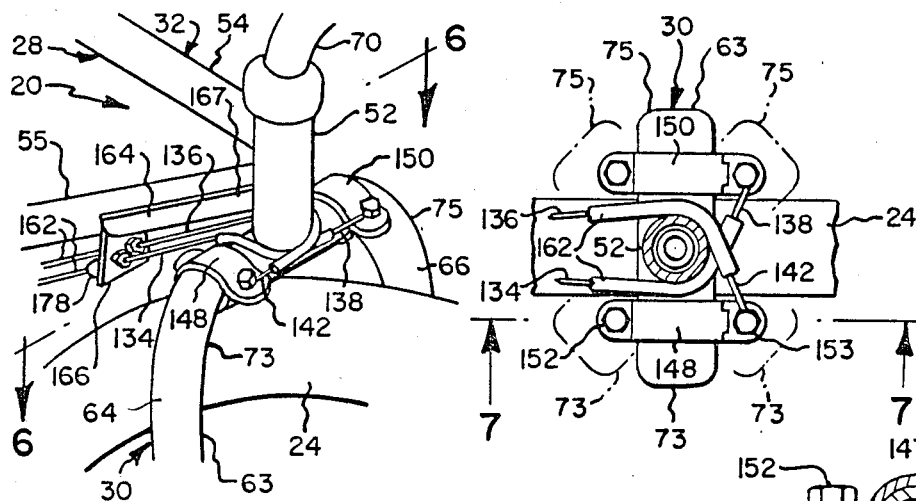
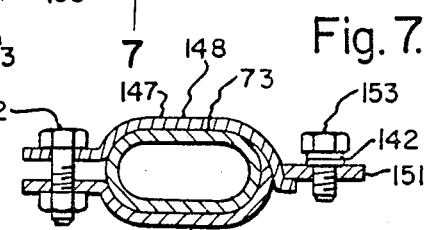
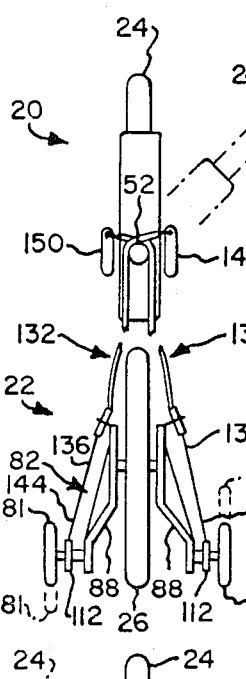
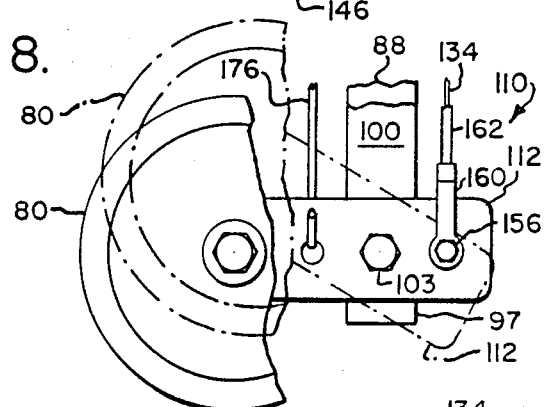
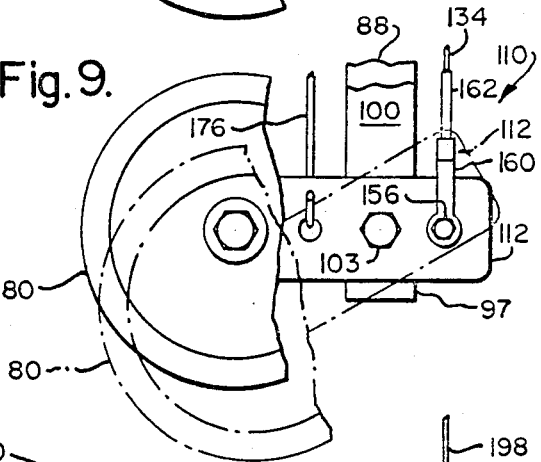
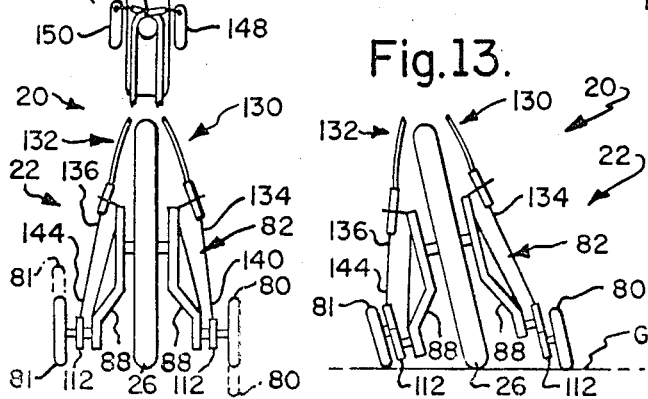
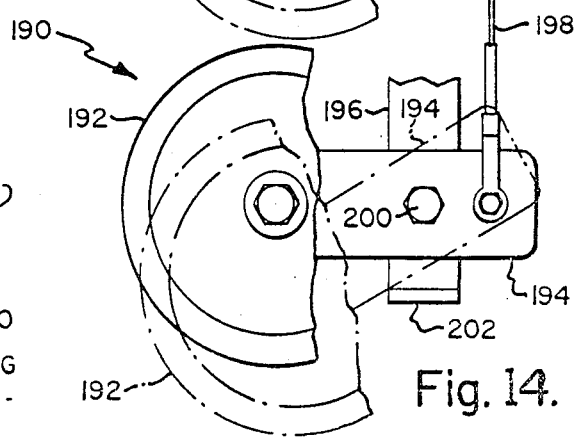

COMPENSATING TRAINING WHEEL ASSEMBLY FOR A BICYCLE

BACKGROUND OF THE INVENTION

This invention relates generally to bicycles and relates more particularly to a training wheel assembly for a bicycle.

The type of training wheel assembly with which this invention is concerned includes a pair of auxiliary wheels attachable to a bicycle to help prevent the bicycle from falling over. Such a training wheel assembly thereby enhances the stability of the bicycle when oriented upright and is especially well-suited for use on a bicycle with which an inexperienced bicycle rider is learning to ride.

Each conventional training wheel assembly typically includes a pair of auxiliary wheels positioned on opposite sides of the bicycle for engaging the ground distally of the bicycle body. Commonly, each auxiliary wheel is suitably journaled to a mounting bracket which is, in turn, fixed to the bicycle body adjacent the rear wheel thereof. The auxiliary wheels thereby act between the ground and bicycle body to resist a tipping or turning over the bicycle upon either of its sides and to thereby stabilize the bicycle when the bicycle is oriented upright.

A limitation associated with a conventional training wheel assembly of the aforedescribed type relates to the reduction of stability provided by the assembly when the front wheel of the bicycle is turned to effect a steering change. Such a reduction of stability is believed to be due, at least in part, to the relatively rigid structural arrangement commonly provided between the auxiliary wheels and the bicycle body which does not permit the bicycle to be leaned, as in the normal action of a bicycle, to one side or the other during the course of a steering change. Hence, motion forces of the bicycle which tend to urge the bicycle along a straight-ahead course and which are normally compensated for by leaning the bicycle when turning are likely to tip the bicycle over when the bicycle is turned. Of course, such a tipping over is undesirable as injury to the rider may result.

Furthermore, a rider must be cognizant when making a turn that the bicycle is prevented from leaning by the aforedescribed conventional assembly, and, accordingly, must make appropriate compensations, such as slowing down the bicycle to a relatively slow rate of speed before the turn is made or leaning his body in the direction of the turn, in order to reduce the likelihood of tipping the bicycle over during the turn. Inasmuch as such compensations are not necessary adjustments when riding a bicycle without training wheels, it is believed that the rider of a bicycle having a conventional assembly attached thereto is not exposed to the normal leaning action of a bicycle without trainig wheels and is instead exposed to an abnormal action of a bicycle during the course of the turn. Hence, an inexperienced rider may be unprepared for the normal leaning action when making the transition from a bicycle with training wheels to a bicycle without training wheels.

It is an object of the present invention to provide a new and improved training wheel assembly for a bicycle for stabilizing the bicycle while the bicycle is oriented upright for straight-ahead drive and during the course of a steering change of the bicycle.

Another object of the present invention is to provide such an assembly which circumvents the aforedescribed limitations associated with the lack of stability involved in turning a bicycle to which a conventional training wheel assembly is attached.

Still another object of the present invention is to provide such an assembly which effectively urges the bicycle to lean during the course of a steering change thereby simulating to the rider the normal action of a bicycle without training wheels when ridden through a turn.

Yet still another object of the present invention is to provide such an assembly having auxiliary wheels which compensate for the leaning of the bicycle during a course of a steering change.

A further object of the present invention is to provide such an assembly which coordinates the steering of the bicycle with the compensating action of the auxiliary wheels so that the degree of compensation provided by the auxiliary wheels is determined by the degree of steering adjustment of the bicycle.

A still further object of the present invention is to provide an assembly for adding a degree of resistance to a change in steering of the bicycle to enhance the controllability of the bicycle for an inexperienced rider.

A yet still further object of the present invention is to provide such an assembly which is durable in construction and effective and reliable in operation.

One more object of the present invention is to provide such an assembly which is economical to manufacture.

SUMMARY OF THE INVENTION

This invention resides in a training wheel assembly for a bicycle.

The training wheel assembly includes bracket means attachable to the body of a bicycle, an auxiliary wheel, and a link member operatively connected between the bracket means and the auxiliary wheel for pivotal movement of the center of the auxiliary wheel relative to the bracket means. The auxiliary wheel is operatively journaled to the link member for rotation relative thereto and the link member is pivotally connected to the bracket means for pivotal movement relative thereto between one condition at which the auxiliary wheel is raised in relation to the bracket means and another condition at which the wheel is lowered in relation to the bracket means. The auxiliary wheel is arranged to one side of the bicycle body when the assembly is operatively attached to the bicycle for operatively engaging the ground distally of the one bicycle side.

The training wheel assembly further includes means associated with the front wheel of the bicycle and the auxiliary wheel for pivoting the auxiliary wheel between the raised and lowered conditions in response to a steering turn of the front wheel so that a steering adjustment of the front wheel toward the side of the bicycle opposite the one bicycle side pivotally moves the auxiliary wheel from the raised condition toward the lowered condition.

Because the auxiliary wheel is pivotally moved as aforesaid during a steering turn of the front wheel toward the side of the bicycle opposite the one side, the assembly urges the bicycle to lean during the course of the steering change in a manner enhancing the stability of the bicycle during the turn and so that the normal leaning action of the bicycle is effectively simulated during the turn.

BRIEF DESCRIPTION OF THE ILLUSTRATED EMBODIMENT

FIG. 1 is a side elevation of a bicycle to which an embodiment of the present invention is operatively attached.

FIG. 2 is a rear elevation view of the FIG. 1 bicycle and embodiment as seen from the left in FIG. 1.

FIG. 3 is a perspective view of a portion of the FIG. 1 bicycle and embodiment, shown exploded.

FIG. 4 is a cross-sectional view taken about on lines 4—4 in FIG. 3.

FIG. 5 is a fragmentary perspective view of the FIG. 1 bicycle and embodiment.

FIG. 6 is a cross-sectional view taken about on lines 6—6 of FIG. 5.

FIG. 7 is a cross-sectional view taken about on lines 7—7 of FIG. 6.

FIG. 8 is a side elevation view, shown partially cut away, of a portion of the FIG. 1 bicycle and embodiment illustrating the relative positioning of the auxiliary wheel when the bicycle front wheel is moved between a position oriented for straight-ahead drive and a position oriented for a directional turn of the bicycle toward the side of the bicycle corresponding with the bicycle side to which the illustrated auxiliary wheel is attached.

FIG. 9 is a view similar to that of FIG. 8 illustrating the relative positioning of the auxiliary wheel when the bicycle front wheel is moved between a position oriented for straight-ahead drive and a position oriented for a directional turn of the bicycle toward the side of the bicycle opposite the bicycle side to which the illustrated auxiliary wheel is attached.

FIG. 10 is a schematic view illustrating the relative positioning of the bicycle front wheel, as seen from above the bicycle, and the auxiliary wheels of the assembly embodiment, as seen from the rear of the bicycle, during a steering turn of the front wheel between a position oriented for straight ahead drive and a position oriented for a directional turn of the bicycle toward the right.

FIG. 11 is a rear view of the bicycle similar to that of FIG. 2 illustrating the leaning of the bicycle in response to a directional turn of the bicycle toward the right.

FIG. 12 is a view similar to that of FIG. 10 illustrating the relative positioning of the bicycle front wheel and auxiliary wheels during a steering turn of the front wheel between a position oriented for straight ahead drive and a position oriented for a directional turn of the bicycle toward the left.

FIG. 13 is a view similar to that of FIG. 11 illustrating the leaning of the bicycle in response to a directional turn of the bicycle toward the left.

FIG. 14 is a view similar to that of FIGS. 8 and 9 illustrating an alternative embodiment of an assembly in accordance with the present invention.

DETAILED DESCRIPTION OF THE ILLUSTRATED EMBODIMENT

Turning now to the drawings in greater detail and considering first FIG. 1, there is shown a bicycle, generally indicated 20, to which an embodiment, generally indicated 22, of a training wheel assembly in accordance with the present invention is attached. The bicycle 20 includes a front wheel 24, a rear wheel 26 and a body, generally indicated 28, joining the front and rear wheels 24,26. The body 28 includes a front frame portion 30 to which the front wheel 24 is journaled and a rear frame portion 32 which the rear wheel 26 is journaled. As will be explained in greater detail hereinafter, the training wheel assembly 22 is operatively attached to the bicycle body 28 for stabilizing the bicycle 20 when the bicycle 29 is oriented upright for straight-ahead drive and during the course of a steering change of the bicycle 20.

With reference to FIGS. 1–3, the rear frame portion 32 includes a rear fork 34 having prongs 36,38 and hub plates 40,42 affixed to the prongs 36,38 as shown. The rear wheel 26 is operatively positioned between the prongs 36,38 and rotatably attached to the hub plates 40,42 so that the hub plates 40,42 are positioned on opposite sides of the center, or axle, of the rear wheel 26 and so that the rotational axis of the rear wheel 26 is oriented transversely of the bicycle 2. As exemplified by the hub plate 40 illustrated in FIG. 3, each hub plate 40 or 42 defines a central aperture 44 aligned with the rotational axis of the rear wheel 26. Extending through the central aperture 44 is a threaded stud 50 protruding axially of the rear wheel axle for joining the rear wheel 26 to the rear frame portion 32. The stud 50 is adapted to accept a washer 49 and nut 51 as will be explained hereinafter.

With reference still to FIG. 1, the rear frame portion 32 includes a sleeve-like member 52 disposed generally above the front wheel 24 and crossbars 54,55,56 fixedly joining the sleeve-like member 53 to the rear fork 34 as shown. The crossbars 54,55,56 cooperate to support the bicycle pedals 58, sprocket wheel 59 and drive chain 60 in a manner well known in the art so that operative rotation of the pedals 58 relative to the bicycle body 28 drivingly turns the rear wheel 26 to propel the bicycle 20 forwardly. Furthermore, a seat 62 for the bicycle 20 is operatively supported atop the crossbar 56.

With reference to FIGS. 1, 5 and 6, the front frame portion 30 includes a handlebar 69 and a front fork 63 having tubular prongs 64,66 positioned on opposite sides of the front wheel 24. The prongs 64,66 define arcuate tubular portions 73,75, respectively, at the upper end thereof which are joined to connect the prongs 64,66 at the upper ends thereof. The tubular portions 73 and 75 are each generally directed toward the right and left side, respectively, of the bicycle 20 when the front wheel 24 is oriented for straight-ahead drive. Joining the handlebar 68 to the fork 63 is elongated pipe-like member 70 suitably journaled within the sleeve-like member 52 for rotation relative thereto. The pipe-like member 70 is fixed at its upper end to the handlebar 68 and fixed at its lower end to the front fork 63 between the tubular portions 73,75. As best shown in FIG. 1, the lower end of the fork prongs 64,66 rotatably support the center, or axle, of the front wheel 24. It will be understood from the foregoing that a turning of the handlebar 68 toward the left or right as the pipe-like member 70 is pivoted or rotated within the sleeve-like member 52 turns the front wheel 24 relative to the rear frame portion 32 to effect a steering or directional change of the bicycle 20.

With reference again to FIGS. 1–4, the training wheel assembly 22 includes a pair of auxiliary wheels 80,81, bracket means 82 attached to the bicycle body 28 for supporting the auxiliary wheels 80,81 distally of and to opposite sides of the bicycle 20 and a pair of link members 112,112 connected between the bracket means 82 and wheels 80,81. As illustrated in FIGS. 1 and 2, the auxiliary wheels 80,81 are each relatively small in diameter as compared to the diameter of the bicycle wheels 24,26 and define a central opening 86 for attachment of the wheel 80 to a corresponding one of the link members 84,84 as will be described hereinafter. Furthermore, auxiliary wheel 80 or 81 is positioned to the right side of the bicycle 20, and auxiliary wheel 81 is positioned to the left side of the bicycle 20.

The bracket means 82 includes a pair of rigid brackets 88,88 each comprised, for example, of steel and including angularly related legs 90,92 as shown. The leg 90 defines a first circular through-hole 94 adapted to receive the threaded stud 50 for securement of the bracket 88 to the bicycle body 28. More specifically and in order to attach the bracket 88 to a corresponding bicycle body 28, the bracket 88 is placed against the hub plate 40 and oriented generally vertically thereagainst so that the stud 50 extends through the through-hole 94. The washer 49 and nut 51 are then operatively positioned upon the stud 50 and the nut 51 is then tightly threaded upon the stud 50 so that the bracket 88 is fixedly held in position against the bicycle body 28 between the hub plate 40 and the nut 51. The bracket leg 90 further includes a second circular through-hole 95 disposed generally above the through-hole 94 for a reason which will be hereinafter apparent.

As shown operatively attached to the bicycle body 28 in FIG. 2, the bracket leg 90 of each bracket 88 is oriented generally vertically and parallel to the plane of rotation of the rear wheel 26, and the bracket leg 92 extends angularly downwardly from the lower end of the bracket leg 90 and away from the corresponding side of the bicycle body 28. As best shown in FIGS. 3 and 4, the bracket leg 92 includes a downturned portion 97 at the lower end thereof, which downturned portion 97 defines an opening 96 therethrough. As will be apparent hereinafter, the downturned portion 97 is arranged generally parallel to the leg 90 so that the central axis of the opening 96 is oriented generally transversely of the bicycle body 28.

With reference to FIG. 3 and in order to prevent each bracket 88 from rotating or pivoting about the stud 50 such as may otherwise result from forces exerted upon the bracket 88 and directed forwardly or rearwardly of the bicycle 20, the bracket means 82 further includes an anti-rotation bracket 111 secured to each bracket 88. The anti-rotation bracket 111 is elongated so as to define two opposite end portions 113,115 wherein end portion 113 defines an aperture for securement of the bracket 111 to the bracket 88 and end portion 115 cooperates with the prong 36 of the rear fork 34 to prevent the bracket 88 from rotating or pivoting about the stud 50. For securement of the bracket 111 to the bracket 88, the bracket end portion 113 is positioned in engagement with the bracket 88 at the upper end thereof and fastened together by means of a bolt 101 and nut (not shown) wherein the shank of the bolt 101 extends through aligned apertures in the bracket 88 and end portion 113. The bracket end portion 115 is configured so as to form a channel 117 adapted to receive the fork prong 36 when positioned thereabout. It follows that as the bracket 111 is effectively maintained in position as the channel 117 is constrained about the fork prong 36, the bracket 88 is prevented from rotating or pivoting about the stud 50 so that the bracket leg 90 is displaced from its illustrated vertically-oriented position.

The bracket means 82 further includes a brace member 100 attached to each bracket 88 so as to extend between the downturned portion 97 and the upper end of the bracket leg 90. The brace member 100 is fixedly secured to the bracket leg 90 by means of the bolt 101 whose shank extends through the aligned apertures in the bracket 88, bracket 111 and brace member 100 at the upper end thereof. As will be apparent hereinafter, the brace member 100 is secured to the downturned portion 97 of the bracket 88 by means of a shoulder bolt 103 which extends through the bracket through-opening 96 and an aligned opening in the lower end of the brace member 100. Furthermore, each brace member 100 defines at its upper end a flange 102 directed generally to one side of the bicycle body 28. The flange 102 defines two openings 104,106 for a reason which will be hereinafter set forth.

In accordance with the present invention and with reference to FIGS. 3 and 4, the training wheel assembly 22 includes means, generally indicated 110, for connecting each auxiliary wheel 80 or 81 to a corresponding one of the brackets 88,88 for pivotal movement of the center of the auxiliary wheel 80 relative to and about the bracket 88. In the illustrated embodiment 22, the connecting means 110 is in the form of a link member 112, introduced earlier, interposed between the wheel 80 and 81 and the corresponding bracket 88. As best shown in FIG. 3, the link member 112 is elongated and plate-like in shape and defines forward and rearward holes 114 and 116, respectively, defined at opposite ends of the member 112. A third hole 118 is positioned intermediate of the holes 114,116, and a fourth hole 119 is positioned intermediate of the holes 116,118. The third hole 118 is aligned with the opening 96 of the bracket leg 92 and an aperture in the brace member 100, and the shoulder bolt 103, introduced earlier, extends through the aligned hole 118 and opening 96. A nut 105 is threaded upon the shoulder bolt 103 so that the the link member 112 is pivotally joined to the bracket 88 and permitted to pivot relative to the bracket 88 about the bolt 103. In the attachment of the shoulder bolt 103 to the link member 112, optional spacer elements 108,109 can be used. Furthermore, the center opening 86 of the wheel 88 is aligned with the link member hole 116, and a shoulder bolt 122 operatively extends through the aligned opening 86 and hole 116 and a nut 123 is threaded upon the bolt 112 so that the wheel 80 is joined to the link member 112 and is permitted to rotate relative to the link member 112 about the shoulder bolt 122. In the connected condition as aforedescribed, each link member 112 and the corresponding wheel 80 or 81 is oriented in such a relation to the bicycle body 28 that the axis of pivot of each link member 112 relative to its corresponding bracket 88 and the rotational axis of the corresponding wheel 80 or 81 is each oriented generally parallel to one another and to the ground G (FIG. 2) and transversely of the bicycle 20 when the bicycle 20 is oriented upright.

With reference to FIGS. 10–13 and in accordance with the present invention, the training wheel assembly 22 includes means, generally indicated 130, associated with the front wheel 24 of the bicycle 20 and the auxiliary wheels 80,81 for pivoting the center of the auxiliary wheels 80,81 between a raised and a lowered condition with respect to the brackets 88,88 in response to a steering turn of the bicycle front wheel 24 to compensate for and facilitate a corresponding leaning of the bicycle 20 toward the left or right during the course of a steering change. To this end, the associated means 130 includes tension means 132 in the form of a pair of cables 134,136 operatively joined at one end to the front fork 63 of the bicycle 20 and operatively joined at the other end to a corresponding link member 112. As will be explained hereinafter, the cables 134,136 sense a change in steering or, more specifically, a pivotal movement of the front wheel 24 relative to the sleeve-like member 52 as the handlebar 68 is turned to effect a steering change and are responsible for a corresponding movement of the link members 112,112 and consequently, pivot the center of the wheels 80,81 about the shoulder bolts 103 (only one shown in FIG. 4) in one pivotal direction or the other relative to the brackets 88,88.

As best illustrated in FIG. 10, the cable 134 includes two opposite end portions 138,140 wherein the end portion 138 is disposed generally above the front wheel 24 of the bicycle 20 and the end portion 140 is disposed to the right side of the rear wheel 26. The cable 136 includes two opposite end portions 142,144 wherein the end portion 142 is disposed generally above the front wheel 29 and the end portion 144 is disposed generally to the left side of the rear wheel 26. The end portions 138 and 142 of the cables 134 and 136, respectively, are fixedly clamped to the the front fork 63 so that forced pivotal movement of the front wheel 24 relative to the sleeve member 52 pulls or relaxes, as the case may be, the cables 134,136.

As best illustrated in FIGS. 5-7 a pair of clamps 148,150 are fixed to the tubular portions 73,75, respectively, for operatively securing the end portions 138 and 142 of the cables 134 and 136, respectively, to the front fork 63. Each clamp 148 or 150 resembles a pipe clamp having two cooperating sections 146,147 and an associated bolt and nut arrangement 152 for fixedly securing the sections 146,147 about the corresponding tubular portion 73 or 75. Furthermore, each section 146 of the clamps 148,150 include a forwardly-protruding portion 151, best shown in FIG. 7, through which a bolt 153 is tightly and threadably secured.

For purposes of securing each cable end portion 138 or 142 to the corresponding clamp 148 or 150, the cable end portion 138 or 142 is tightly wrapped around so as to be effectively tied to the shank of the bolt 153. Furthermore, each bolt 153 is tightened so that the wrapped end portion 138 or 142 is tightly held between the clamp protruding portion 151 and the head of the bolt 153.

With reference again to FIGS. 2 and 3, the cable end portions 144 and 140 are operatively connected to the link members 112,112 so that a pulling or relaxing of the cables 134,136 as the front wheel 24 is turned during a steering change effects a corresponding response in the auxiliary wheels 80,81. More specifically and as best shown in FIG. 3, the cable end portion 140 is securely fastened by means of a clamp 160 to the link member 112 positioned on the right side of the bicycle 20 so that the pivot pin or shoulder bolt 103 is positioned between the center of the wheel 80 and the clamp 160. Similarly, the cable end portion 144 is securely fastened by means of a clamp 160 to the link member 112 positioned on the left side of the bicycle 20 to join the cable end portion 144 to the corresponding link 112 at an end thereof opposite the link member end to which the corresponding wheel 81 is joined. Each cable end portion 140 or 144 terminates in a ball (not shown), and each clamp 160 cooperates with, or is fastened about, the ball to join the corresponding cable end portion 140 or 144 thereof. Each clamp 160 is, in turn, affixed to the corresponding link member 112 by means of a bolt 156 whose shank extends through aligned openings in the clamp 160 and opening 114 in the link member 112.

It follows from the foregoing that a raising of the forward end of the link 112 relative to the bracket 88 by means of a cable end portion 138 or 142 pivots the corresponding link 112 about the shoulder bolt 103 and lowers the corresponding auxiliary wheel 80 or 81 relative to the bracket 88.

Between the end portions of each cable 134 and 136, the cables pass through one of a pair of flexible steel sleeves 162,162 comprised, for example, of wire loosely wrapped about the cable 134 or 136 to permit the cable to be slidably moved along the length thereof. Each end of a sleeve 162 abuts or is appropriately anchored to a surface of the bicycle body 28 so that operative sliding movement of an end portion of a cable 134 o4 136 relative to its sleeve 162 effects a corresponding sliding movement of the opposite end portion of the cable relative to the sleeve 162 positioned forwardmost of the bicycle 20 is anchored to the bicycle crossbar 55 by means of a bracket 164, and the end of each sleeve 162 or 162 positioned rearwardmost of the bicycle 20 is anchored to a corresponding bracket flange 102. Each cable 134 or 136 and its corresponding sleeve 162 can be provided by conventional bicycle brake cable.

With reference to FIGS. 1 and 5, the bracket 164 includes an apertured flange 166 through which the cable end portions 138 and 142 extend and a crossbar-engaging portion 167 which abuts the sleeve-like member 53 of the bicycle body. The bracket portion 167 is fixedly secured to the crossbar 55 by means of a U-bolt and is prevented from sliding forwardly of the bicycle body 28 and along the length of the crossbar 55 because of its abutting relationship with the sleeve-like member 52.

With reference again to the cables 134,136 and to FIGS. 1 and 3, each sleeve 162 positioned about the cables 134,136 terminates at one end in a cap 178 and terminates at the other end in a cap 180. One cap 178 is positioned in abutting relationship with the apertured flange 166 of the bracket 164 and the other cap 180 cooperates with tension-adjusting means, generally indicated 182, and the flange 102 of the brace member 100 in a manner permitting the tension on the cables 134,136 to be manually adjusted. The tension-adjusting means 182 includes a relatively long stud 184 threadably received by the flange aperture 104, a wing nut 186 threadably affixed upon the stud 184, and a cap-receiving socket member 188 journaled within the wing nut 186. The cap 180 is received by the socket member 188, and the wing nut 186 is positioned in engagement with the flange 106 and arranged between the flange 106 and socket member 188.

By manually rotating the wing nut 186 relative to the stud 184 in one rotational direction or the other, the tension of the corresponding cable 134 or 136 is adjusted to thereby adjust the downwardly-directed force exerted upon the ground by the auxiliary wheel 80 or 81. The operation of the tension-adjusting means is comparable to tension-adjusting means of bicycle brake cables known in the art. Briefly, by rotating the wing nut 186 so that the cable sleeve 162 is effectively compressed in length as the cap 180 is pushed toward the cap 178, the tension upon the corresponding cable 134 or 136 is increased so that the downwardly-directed force exerted by the corresponding wheel 80 or 81 is increased. Similarly, by rotating the wing nut 186 so that the compression of cable sleeve 162 is effective relaxed, the cable tension is relaxed so that the downwardly-directed force exerted by the corresponding wheel 80 or 81 is decreased. Because the stud 184 of the tension-adjusting means 182 is relatively long, gross adjustments of the cable tension or the position of the wheels 80,81 relative to the brackets 88,88 can be made.

With reference still to FIG. 3, the training wheel assembly 22 further includes a pair of tension springs 176 (only one shown in FIG. 3) connected between the flange 102 and the link 112. More specifically, the upper end of each spring 176 is hooked through the flange aperture 106 to thereby secure the upper end at the spring to the bracket 88, and the lower end of each spring 176 continually bias each link 112 about the corresponding shoulder bolt 103 in opposition to the pulling force that the cable 134 or 136 may exert upon the link 112. An advantage provided by the tension springs 176 relates to the fact that the auxiliary wheels 80,81 are prevented by the springs 176 from dropping into a hole if driven thereacross.

In accordance with the present invention and with reference still to FIGS. 2 and 3, the cables 134,136 are so sized and render sufficient tension upon the link members 112 that when operatively connected between the front fork 63 and link members 112, the auxiliary wheels 80,81 are urged downwardly against the ground yet the rear wheel 26 of the bicycle 20 is maintained in operative rolling engagement with the ground G. Therefore, the weight of the rear of the bicycle 20 is distributed between the rear wheel 26 and the auxiliary wheels 80,81. Such urging of the auxiliary wheels 80,81 downwardly against the ground G thereby aids in the support of the bicycle when in an upright condition and enhances the stability of the bicycle when ridden. As shown in FIGS. 2, 3, 8 and 9, the link members 112 are oriented generally horizontally, or parallel to the longitudinal axis of the bicycle body 28, when the bicycle 20 is oriented upright and for straight-ahead drive.

During the course of a steering turn of the bicycle 20 and with reference to FIGS. 8-13, the turning movement of the front wheel 24 or the handlebar 68 relative to the sleeve-like member 52 acts through the cables 134,136 to pivotally move the auxiliary wheels 80,81 between raised and lowered conditions. Considering first the action of auxiliary wheel 80 and with reference to FIGS. 8, 10 and 11, a steering turn of the front wheel 24 from the straight-ahead drive position illustrated in solid lines in FIG. 10 toward the right to the position illustrated in phantom in FIG. 10 effects a relaxing of the cable 134 to raise the auxiliary wheel 80 in relation to the bracket 88. Such a rightward steering turn pivots the front fork 63 relative to the sleeve-like member 52 so that the tubular portion 75 (FIG. 5) effectively relieves the tension upon the cable 134. In response to such a relief of the cable 134 by the tubular portion 75, the link member 112 is permitted to pivot about the shoulder bolt 103 in a clockwise direction as viewed in FIG. 8 so that the auxiliary wheel 80 is permitted to move from the position illustrated in solid lines in FIG. 8 toward the raised position illustrated in phantom in FIG. 8.

With reference to FIGS. 9, 12 and 13, a steering turn of the front wheel 24 from the straight-ahead drive position illustrated in solid lines in FIG. 12 toward the left to the position illustrated in phantom in FIG. 12 effects a pulling of the cable 134 to lower the auxiliary wheel 80 in relation to the bracket 88. Such a leftward steering turn pivots the front fork 63 relative to the sleeve-like member 52 so that the tubular portion 73 (FIG. 5) pulls upon the cable 134 in a manner pivoting the link member 112 about the shoulder bolt 103 in a counter-clockwise direction as viewed in FIG. 9 so that the auxiliary wheel 80 is forcibly moved from the position illustrated in solid lines in FIG. 9 toward the position illustration illustrated in phantom in FIG. 9.

The action of the cable 136 is opposite that of the cable 134 in that a rightward steering turn of the front wheel 24 relaxes the cable 136 so that the auxiliary wheel 81 can pivotally move to a raised condition, and a leftward steering turn of the front wheel 24 pulls the cable 136 so that the auxiliary wheel 81 is pivotally moved to a lowered condition. For example and as the front wheel 24 is turned rightwardly from a straight-ahead drive orientation, the link member associated with auxiliary wheel 81 is permitted to pivot about the corresponding shoulder bolt 103 from a generally horizontally-oriented condition to which the wheel 81 is positioned at one location to a condition at which the wheel 81 is elevated in relation to the one location. Furthermore, and as the front wheel 24 is turned leftwardly from a straight-ahead drive orientation, the link member 112 associated with wheel 81 is forcibly moved about the bolt 103 from a generally horizontally-oriented condition at which the wheel is positioned at one location to a condition at which the wheel 31 is lowered in relation to the one condition.

For preventing the cable end portions 138,142 from rubbing against the sleeve-like member 52 as the cable 134,136 are effectively pulled or relaxed during the course of a steering change, the cable end portions 138,142 are sheathed by a protective covering 204 as shown in FIG. 5.

It follows from the foregoing that the forced movement of the one of the auxiliary wheels 80 or 81 toward the aforedescribed lowered condition as the front wheel 24 is turned rightwardly or leftwardly forces the bicycle to lean toward the side of the bicycle 20 opposite the auxiliary wheel 80 or 81 being lowered and the permitted movement of the other auxiliary wheel 81 or 80 toward the aforedescribed raised condition accommodates the forced leaning. For example and as shown in FIG. 11, the auxiliary wheels 80,81 act between the bicycle body 28 and the ground G during a steering turn of the bicycle 20 toward the right to lean the bicycle body 28 toward the right. Similarly and as shown in FIG. 13, the auxiliary wheels 80,81 act between the bicycle body 28 and the ground G during a steering turn of the bicycle 20 toward the left to lean the bicycle body 28 toward the left. Inasmuch as the leaning of the bicycle body 28 to the right or left in response to a steering turn of the bicycle 20 to the right or left, respectively, simulates the normal action of a bicycle during the course of a steering change and is thereby advantageous in that the rider is exposed to the normal action of the bicycle during a turn while the training wheel assembly 22 supports the bicycle 20 in such a manner so as to resist a turning over of the bicycle upon a side during the turn.

In the training wheel assembly 24, the degree of raising or lower of the auxiliary wheels 80,81 in relation to the brackets 86,88 is coordinated with the degree of steering turn of the front wheel 24 so that a preselected amount of steering turn results in a preselected amount of pivotal movement of the auxiliary wheels 80,81 about the shoulder bolts 103 and consequently a preselected amount of leaning of the bicycle 20. In the assembly 24 which has been found to provide a satisfactory and suitable amount of leaning of the bicycle 20 each wheel 80 or 81 is located about 8 inches (20 cm) to the side of the rear wheel 26, the distance as measured from the centerline of link member opening 114 at which the cable 134 or 136 is connected to the link member 112 to the centerline of the link member opening 118 is about 1 inch (2.5 cm) and the distance as measured from athe centerline of link member opening 118 to the centerline of the member opening 116 is about 1.5 inches (3.8 cm).

Another advantage provided by the assembly 22 relates to the tension rendered by the cables 134,136 upon the link members 112 so that the auxiliary wheels 80,81 are urged downwardly toward the ground G so as to support a portion of the weight of the bicycle. More specifically, the tension, or preload, of the cabls 134,136 provides a degree of resistance to any steering turn of the bicycle 20. Such a resistance to turning is believed to enhance the controllability of the bicycle for an inexperienced rider.

Another advantage provided by the assembly 22 relates to its adaptability to be used on bicycles of different sizes. For example, inasmuch as the illustrated bicycle 20 is a twenty-inch bicycle wherein the assembly brackets 88,88 (FIG. 3) are connected to the bicycle body 28 by means of the bracket opening 94, the brackets 88,88 can be operatively attached to the body of a twenty-four inch bicycle by means of the bracket opening 95.

It will be understood that numerous modifications and substitutions can be had to the aforesaid embodiment 22 without departing from the spirit of the invention. For example, a training wheel assembly in accordance with the present invention may not include tension springs 176,176. For example, there is shown in FIG. 14 a portion of an alternative assembly 190 including an auxiliary wheel 192, a link member 194 to which the wheel 192 is journaled, and a bracket 196 to which the link member 194 is pivotally attached by means of a bolt 200. The bracket 196 is fixedly attached to the body of a bicycle, and a cable 198 attached to the front fork of the bicycle is operatively attached to the link member 194 at a location therealong opposite the location at which the auxiliary wheel 192 is connected for pivoting the center of the wheel 192 about the bolt 200 such as for example from the position illustrated in solid lines to the position illustrated in phantom. To prevent the wheel 192 from falling into a hole if driven thereacross, the bracker 196 includes a flange 202 disposed beneath the link member 194. Accordingly, the aforedescribed assembly embodiment 22 is intended for the purpose of illustration and not as limitation.

I claim:

1. In a training wheel assembly for a bicycle including a bracket for attachment to the body of the bicycle and an auxiliary wheel supported by the bracket for engagement of the ground distally of and to one side of the bicycle, the improvement comprising:

a link member disposed in a plane and operatively connected between said bracket and said auxiliary wheel for movement of the center of said auxiliary wheel between raised and lowered conditions, said auxiliary wheel being operatively journaled at its center to said link member for rotation relative thereto and disposed in a plane substantially parallel to said plane of said link member, said link member being pivotally connected to said bracket for pivotal movement relative thereto so that when said bracket is operatively attached to the bicycle body, the center of said auxiliary wheel is movable between a raised condition and a lowered condition; and external means coupled to the body of the bicycle at spaced locations and associated with the front wheel of the bicycle by a front support bracket means and with said auxiliary wheel by a rearward support bracket means for pivoting said auxiliary wheel between said raised condition and said lowered condition in response to a steering turn of the front wheel to accommodate a leaning of the bicycle toward one side when the front wheel is turned toward the side of the bicycle corresponding with said one side and to contribute to the leaning of the bicycle toward the other side of the bicycle when the front wheel is turned toward the side of the bicycle opposite said one bicycle side.

2. The improvement of claim 1 wherein said external associated means includes preloaded elongated tension means operatively attached at one end to the front wheel of the bicycle and attached at the other end to the link member so that the auxiliary wheel supports at least a portion of the weight of the bicycle when the bicycle is driven straight ahead and during the course of a steering turn of the bicycle.

3. The improvement of claim 2 further comprising means for adjusting the amount of preload of said tension means.

4. The improvement of claim 1 wherein said associated means coordinates the degree of pivotal movement of the auxiliary wheel with the degree of steering turn of the front wheel so that said auxiliary wheel is maintained in operative engagement with the ground while the bicycle is leaned during a course of a steering change.

5. The improvement of claim 1 wherein said external associated means includes tension means connected between the front bicycle wheel and said auxiliary wheel so that a turning movement of the front wheel toward the side of the bicycle opposite said one side acts through said tension means to pivotally move said auxiliary wheel from one condition and positively locate said auxiliary wheel in a lower condition and a turning movement of the front wheel toward the side of the bicycle corresponding with said one bicycle side acts through said tension means to pivotally move said auxiliary wheel from one condition and positively locate said auxiliary wheel in an elevated condition.

6. The improvement of claim 1 wherein said link member is elongated in shape with two opposite end portions and is journally attached to said external means at one end of said link member.

7. The improvement of claim 1 further comprising means for preventing said auxiliary wheel from falling into a hole when driven thereacross.

8. The improvement of claim 7 wherein said preventing means includes biasing means for acting between said bicycle body and said auxiliary wheel to bias said auxiliary wheel from said lowered condition to said raised condition so that said auxiliary wheel is pivotally and continually urged toward said raised condition by said biasing means.

9. A training wheel assembly for a bicycle comprising:

bracket means attachable to the body of a bicycle for supporting an auxiliary wheel distally of and to one side of the bicycle body;

an auxiliary wheel;

a link member operatively connected between said bracket means and said auxiliary wheel for movement of the center of said auxiliary wheel between raised and lowered conditions, said auxiliary wheel being operatively journaled to said link member for rotation relative thereto and said link member being pivotally connected to said bracket means for pivotal movement relative thereto so that when said bracket means is operatively attached to the bicycle body, the center of said auxiliary wheel is movable between a lowered condition at which said auxiliary wheel is lowered in relation to said bracket means and a raised condition at which said auxiliary wheel is raised in relation to said bracket means; and external means coupled to the body of the bicycle at spaced locations and associated with the front wheel of the bicycle by a front support bracket means for coupling pivotal movement of the front wheel to said external means and with said auxiliary wheel by a rearward support bracket means for pivoting said auxiliary wheel between said raised condition and said lowered condition in response to a steering turn of the front wheel toward the side of the bicycle corresponding with said one bicycle side pivotally moves said auxiliary wheel toward said raised condition and a steering turn of the front wheel toward the side of the bicycle opposite said one bicycle side permits said auxiliary wheel to pivotally move toward said lowered condition, said rearward support bracket means limiting pivotal movement of said link member.

10. The assembly of claim 9 wherein said external associated means includes preloaded elongated tension means operatively attached at one end to the front wheel of the bicycle and attached at the other end to the link member so that the auxiliary wheel supports at least a portion of the weight of the bicycle when the bicycle is driven straight ahead and during the course of a turn.

11. In a training wheel assembly for a bicycle including a pair of bracket means for attachment to the body of the bicycle and a pair of auxiliary wheels supported by the bracket means for engagement of the ground distally of and to opposite sides of the bicycle, the improvement comprising:

a pair of link members disposed in spaced-apart substantially parallel planes and operatively connected between corresponding ones of said bracket means and said auxiliary wheels for movement of the center of each auxiliary wheel between raised and lowered conditions, each of the auxiliary wheels being journaled at its center to a corresponding link member for rotation relative thereto, and disposed in a plane substantially parallel to the plane of said corresponding link member, each link member being pivotally connected to said bracket means for pivotal movement relative thereto so that when said bracket means is operatively attached to the bicycle body, the center of each auxiliary wheel is between a raised condition and a lowered condition; and external means coupled to the body of the bicycle at spaced locations and associated with the front wheel of the bicycle by a front support bracket means and the auxiliary wheels by a rear support bracket means for pivoting the auxiliary wheels between the raised and lowered conditions in response to a steering turn of the front wheel so that when the front wheel of the bicycle is turned during a steering change toward one side of the bicycle, the auxiliary wheel positioned to one side of the bicycle accommodates a leaning of the bicycle toward said one side and the auxiliary wheel positioned to the other side of the bicycle contributes to the leaning of the bicycle toward said one side and so that when the front wheel of the bicycle is turned during a steering change toward the opposite side of the bicycle, the auxiliary wheel positioned to one side of the bicycle contributes to the leaning of the bicycle toward said other side and the auxiliary wheel positioned to the other side of the bicycle accommodates a leaning of the bicycle toward the other side of the bicycle.

12. The improvement of claim 11 wherein said external associated means includes a pair of preloaded tension cables each being operatively connected between the front wheel of the bicycle and a corresponding link member so that the auxiliary wheels support a portion of the weight of the bicycle when the bicycle is driven straight ahead and during the course of a steering change of the bicycle.

13. The improvement of claim 11 wherein said associated means coordinates the degree of pivotal movement with the degree of steering turn of the front wheel so that each auxiliary wheel is maintained in operative engagement with the ground while the bicycle is leaned during the course of a steering change.

14. The improvement of claim 11 wherein said external associated means includes a pair of cables each being operatively connected between the front bicycle wheel and a corresponding auxiliary wheel so that a turning movement of the front wheel toward said one bicycle side acts through said cables to selectively permit the auxiliary wheels to pivot as aforesaid or pivotally move the auxiliary wheels as aforesaid.

* * * * *

UNITED STATES PATENT AND TRADEMARK OFFICE
CERTIFICATE OF CORRECTION

PATENT NO. : 4,810,000

DATED : March 7, 1989

INVENTOR(S) : Stephen R. Saunders

It is certified that error appears in the above-identified patent and that said Letters Patent is hereby corrected as shown below:

```
Item [76],
on the first page of the patent the address of the inventor
should be changed from "4649" to --4946--.
```

Signed and Sealed this

Seventeenth Day of October, 1989

Attest:

DONALD J. QUIGG

Attesting Officer

Commissioner of Patents and Trademarks